United States Patent [19]

Kleiböhmer

[11] Patent Number: 4,588,071
[45] Date of Patent: May 13, 1986

[54] CHAIN CONVEYOR WITH DIVERGING INTERLEAVED SCRAPERS

[75] Inventor: Friedrich Kleiböhmer, Kamen, Fed. Rep. of Germany

[73] Assignee: Gewerkschaft Eisenhutte Westfalia, Lunen, Fed. Rep. of Germany

[21] Appl. No.: 657,299

[22] Filed: Oct. 3, 1984

[30] Foreign Application Priority Data

Oct. 12, 1983 [DE] Fed. Rep. of Germany ....... 3337045

[51] Int. Cl.⁴ ............................................. B65G 65/06
[52] U.S. Cl. .................................. 198/516; 198/520; 198/726
[58] Field of Search ................ 198/516, 726, 520, 728, 198/735, 512, 733; 414/528

[56] References Cited

U.S. PATENT DOCUMENTS

| | | | |
|---|---|---|---|
| 2,263,458 | 11/1941 | Gellatly | 198/728 |
| 2,865,493 | 12/1958 | Pierre | 198/733 |
| 3,154,190 | 10/1964 | Gonski | 198/735 X |
| 3,190,697 | 6/1965 | Gonski | 198/516 X |
| 3,651,923 | 3/1972 | Anderson et al. | 198/728 X |
| 3,748,759 | 7/1973 | Liess | 414/528 X |

FOREIGN PATENT DOCUMENTS

| | | | |
|---|---|---|---|
| 1207911 | 12/1965 | Fed. Rep. of Germany . | |
| 901071 | 7/1962 | United Kingdom | 198/728 |

*Primary Examiner*—Robert J. Spar
*Assistant Examiner*—Jonathan D. Holmes
*Attorney, Agent, or Firm*—Sughrue, Mion, Zinn, Macpeak and Seas

[57] ABSTRACT

A load conveyor for a cutting machine comprises two outer, endless chains, and an endless further chain positioned between the two outer chains. Each of the chains carries scrapers. All of the chains are driven, via a common drive drum, by a drive station. The scrapers of adjacent chains interdigitate in the manner of the teeth of a zip fastener, at least in the zone of the drive station.

4 Claims, 1 Drawing Figure

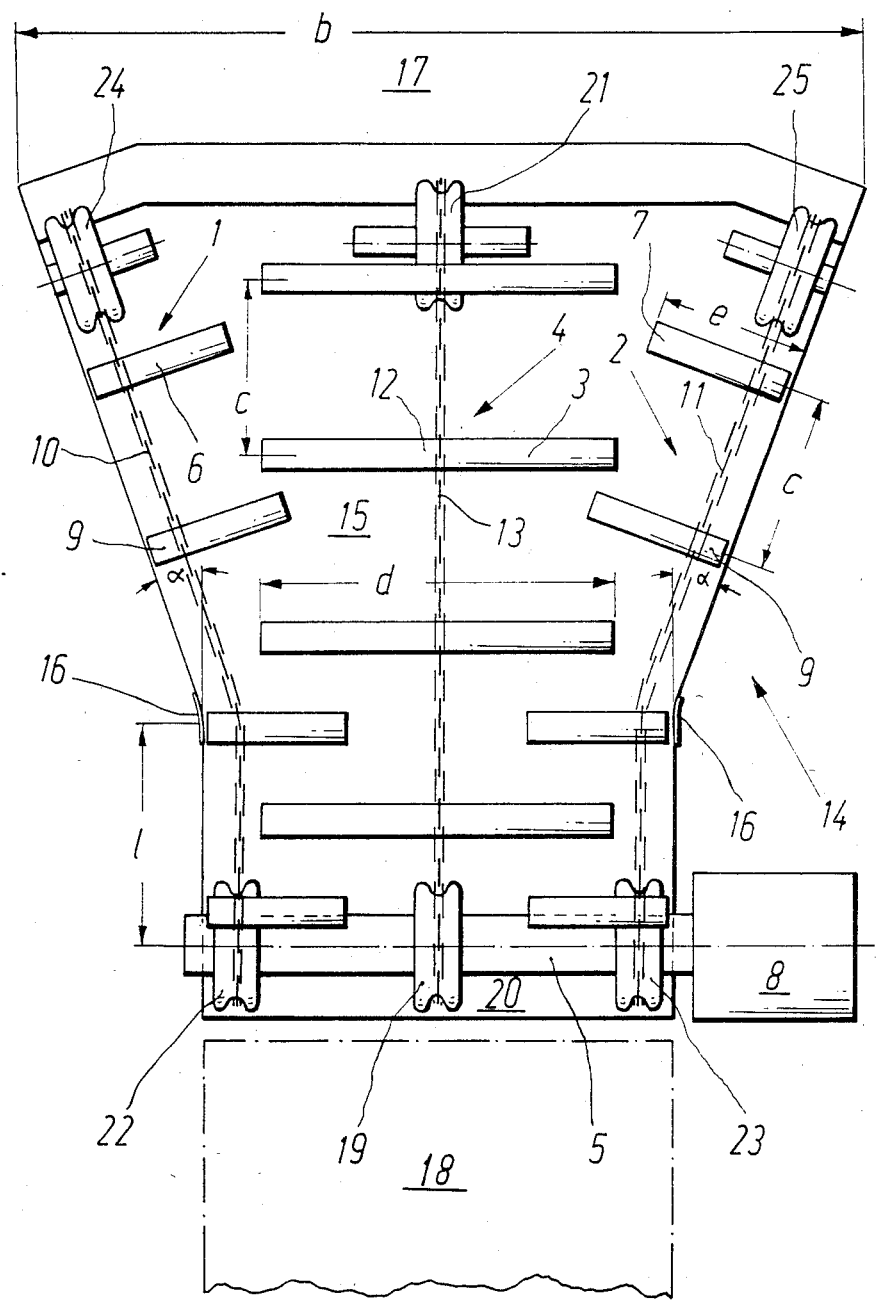

CHAIN CONVEYOR WITH DIVERGING INTERLEAVED SCRAPERS

BACKGROUND TO THE INVENTION

This invention relates to a conveyor, and in particular to a scraper-chain conveyor for use as the load conveyor of a cutting machine.

A known type of cutting machine has a load conveyor which includes two endless chains which are driven by a common chain drum. The two chains carry scrapers which interdigitate in the manner of the teeth of a zip fastener at least in the zone of the conveyor drive station. A cutting machine of this type is used to win mineral material (such as coal) from a mineral face, or to drive roadways or galleries in a mine working. Each chain is generally L-shaped when viewed in plan, having two portions at right-angles to one another. First portions of the two chains run alongside one another end-to-end at the front end of the conveyor, that is to say the end adjacent to the face which is to be cut. Second portions of the two chains run parallel with one another, and at right-angles to the face. The two chains are driven by a common drive drum positioned at the ends of the second portions remote from the face. At the transfer zone between its two portions, each of the chains passes round a roller. The passing of the two chains round their rollers through approximately 90° generates relatively heavy frictional forces. These large frictional forces require a large and powerful drive station, and result in relatively rapid wear of the chains and rollers. A load conveyor of this type is described in DE-AS No. 1 207 911.

The aim of the invention is to provide a load conveyor which requires only a single drive, but which does not involve large frictional forces.

SUMMARY OF THE INVENTION

The present invention provides a load conveyor for a cutting machine, the load conveyor comprising two endless, outer chains and at least one endless further chain positioned between the two outer chains, each of the chains carrying scrapers, and all of the chains being driven, via a common drive drum, by a drive station, wherein the scrapers of each pair of adjacent chains interdigitate in the manner of the teeth of a zip fastener, at least in the zone of the drive station.

With this conveyor, the outer chains can diverge through a relatively small angle, thereby ensuring a sufficiently wide loading face. The median zone of the loading face of the conveyor is swept by the further chain(s), so that material can be conveyed away along the entire width of the loading face. As the output end of the conveyor can be relatively narrow, only a single drive drum is necessary for all the chains.

Advantageously, the end portions of the scrapers of the outer chains are connected to the outer chains, and the middle portions of the scrapers of the further chain(s) are connected to further chain(s). Thus, the scrapers can engage one another (in the manner of the teeth of zip fasteners) over a relatively great distance in the zone of the drive station. The further chain may be a single chain or a double chain. The distance between the outer chains in the zone of the drive station can, however, be kept particularly small if a single chain is used for the further chain.

In a preferred embodiment there is one further chain, the scrapers of the two outer chains being arranged symmetrically in relation to each other, and the scrapers of the further chain engaging between the scrapers of the outer chains at least in the zone of the drive station. This arrangement enables the conveyor to be of relatively narrow construction in the zone of the drive station, so that transfer to a downstream conveyor can take place in a relatively simple manner. It is, however, possible to provide two or more further chains, so that the width of the loading face can be increased.

Preferably, all the chains extend substantially parallel to one another in the zone of the drive station, and the outer chains diverge away from the further chain at a distance from the drive station. The outer chains may be diverted, at the zones of divergence, by angled wear plates or guide rollers. This arrangement ensures that the chains run on the drive drum in a manner involving a particularly low degree of wear, although a relatively wide loading face can be covered.

BRIEF DESCRIPTION OF THE DRAWING

A load conveyor for a cutting machine, and constructed in accordance with the invention, will now be described, by way of example, with reference to the accompanying drawing, the single FIGURE of which is a plan view of the conveyor.

DESCRIPTION OF PREFERRED EMBODIMENT

Referring to the drawing, a scraper-chain conveyor 14 is positioned in front of a face 17. The conveyor 14 is a loading conveyor of a cutting machine (not shown) such as a short wall header. The conveyor receives material detached from the face 17, and transfers it to a downstream conveyor 18 (not shown in detail) positioned at the output end 20 of the conveyor 14. The scraper-chain conveyor 14 has three endless chains 1, 2 and 4 which are driven, via a common drive drum 5, by a drive station 8. The chains 1, 2 and 4 are all round-link chains.

The middle chain 4 is provided with scrapers 3, whose central portions 12 are attached, by means of standard connecting elements (not shown) to links 13 of the chain. The chain 4 is driven by a sprocket wheel 19, which is fixed to the drive drum 5. The chain 4 is reversed, at the face side, by means of an idler roller 21. The chain 4 follows a rectilinear path between the sprocket wheel 19 and the idler roller 21.

The two outer chains 1 and 2 are arranged symmetrically at opposite sides of the chain 4. The outer chains 1 and 2 are provided with scrapers 6 and 7 respectively. End portions 9 of the scrapers 6 and 7 are attached to links 10 and 11 respectively of the chains 1 and 2. The outer chains 1 and 2 are driven by sprocket wheels 22 and 23 respectively, which are fixed to the drive drum 5. The outer chains 1 and 2 are reversed, at the face side, by respective idler rollers 24 and 25. The outer chains 1 and 2 run parallel to the chain 4 in the zone of the drive station 8. In order to obtain an adequate working width b in the loading zone of the conveyor 14, the outer chains 1 and 2 each diverge through an angle a at a distance 1 from the drive drum 5. Angled wear plates 16 are provided to guide the scraper end portions 9 in the zones of divergence. Alternatively, guide rollers could be provided in place of the wear plates 16. The distance c between the scrapers 3, 6 or 7 of each of the chains 4, 1 or 2 respectively, the length d of the scrapers 3, and the length e of the scrapers 6 and 7 are so selected that the scrapers interdigitate in the manner of the teeth of a zip fastener over the greatest possible distance, at least in the zone of the drive station 8. However, the scrapers 3, 6 and 7 do not impede each other.

The outer chains 1 and 2 are guided and supported by angled side walls (not shown) which flank a floor plate 15. These may consist of the usual sigma-shaped sections. The drive station 8 for the scraper-chain conveyor 14 may be, for example, an electric or hydraulic motor, with gears optionally interposed.

It will be apparent that the scraper-chain conveyor described above could be modified in a number of ways. Thus, only a single chain 4 is provided between the two outer chains 1 and 2 in the embodiment described, but it is quite possible to arrange two or more chains in the median zoen of the load conveyor. The scrapers of such chains would like wise engage each other in the manner of the teeth of a zip fastener, so as to increase the width b of the conveyor input zone. It would also be possible for the scrapers 3 to be fixed to a double chain instead of a single one. Moreover, the invention is not limited to the use of round-link chains.

I claim:

1. A load conveyor for a cutting machine, the load conveyor comprising: two endless, outer chains (1, 2) and at least one endless further chain (4) positioned between the two outer chains, each of the chains carrying scrapers (3, 6, 7), and all of the chains being driven, via a common drive drum (5), by a drive station (8) in a direction to convey mined mineral pieces toward the drive drum, wherein the scrapers of each pair of adjacent chains interdigitate in the manner of the teeth of a zip fastener, at least in the zone of the drive station, wherein outer end portions (9) of the scrapers of the outer chains are connected to the outer chains, and middle portions (12) of the scrapers of the further chain are connected to the further chain, wherein all the chains have fixed paths of movement and extend substantially parallel to one another in a zone of the drive station, and wherein the outer chains diverge away from the further chain at a predetermined distance (1) from the drive station.

2. A conveyor according to claim 1, wherein there is one further chain, the scrapers of the two outer chains are arranged symmetrically in relation to each other, and the scrapers of the further chain engage between the scrapers of the outer chains at least in the zone of the drive station.

3. A conveyor according to claim 2, further comprising angled wear plates (16) positioned at zones where the outer chains diverge to guide said outer chains through their zones of divergence.

4. A conveyor according to claim 1, further comprising angled wear plates (16) positioned at zones where the outer chains diverge to guide said outer chains through their zones of divergence.

* * * * *